(12) United States Patent
Singh et al.

(10) Patent No.: US 11,715,108 B2
(45) Date of Patent: Aug. 1, 2023

(54) METHODS AND SYSTEMS FOR ENHANCING PURCHASE EXPERIENCE VIA AUDIO WEB-RECORDING

(71) Applicant: Mastercard International Incorporated, Purchase, NY (US)

(72) Inventors: Sachin Kumar Singh, Pune (IN); Kaushal Naveen Shetty, Thane (IN); Venkata Satya Sivajee Pinnamaneni, Dardenne Prairie, MO (US)

(73) Assignee: Mastercard International Incorporated

( * ) Notice: Subject to any disclaimer, the term of this patent is extended or adjusted under 35 U.S.C. 154(b) by 175 days.

(21) Appl. No.: 17/379,684

(22) Filed: Jul. 19, 2021

(65) Prior Publication Data
US 2023/0023573 A1   Jan. 26, 2023

(51) Int. Cl.
| | |
|---|---|
| *G06Q 20/40* | (2012.01) |
| *G06Q 20/36* | (2012.01) |
| *G06Q 20/32* | (2012.01) |
| *G06F 40/284* | (2020.01) |
| *G06F 40/134* | (2020.01) |

(52) U.S. Cl.
CPC ....... *G06Q 20/4016* (2013.01); *G06F 40/134* (2020.01); *G06F 40/284* (2020.01); *G06Q 20/326* (2020.05); *G06Q 20/363* (2013.01)

(58) Field of Classification Search
None
See application file for complete search history.

(56) References Cited

U.S. PATENT DOCUMENTS

| | | | |
|---|---|---|---|
| 10,552,544 B2 * | 2/2020 | Chakravarthy | ........ G06N 20/00 |
| 11,017,426 B1 * | 5/2021 | Garg | .................. G06Q 30/0244 |
| 2019/0349321 A1 * | 11/2019 | Cai | ........................ G06N 3/04 |

FOREIGN PATENT DOCUMENTS

AU    2020100710    6/2020

OTHER PUBLICATIONS

Jansen, Bernard J., and Paulo R. Molina. "The effectiveness of Web search engines for retrieving relevant ecommerce links." Information Processing & Management 42.4 (2006): 1075-1098. (Year: 2006).*
Web article entitled SKlearn.Feature Extraction Text from webpage https://scikit-learn.org/stable/modules/generated/sklearn.feature_extraction.text.CountVec (printed Oct. 29, 2020).

(Continued)

*Primary Examiner* — Calvin L Hewitt, II
*Assistant Examiner* — Brock E Turk
(74) *Attorney, Agent, or Firm* — Hovey Williams LLP

(57) ABSTRACT

A computer system includes a processor programmed to process a first web page to identify a hyperlink contained thereon. The hyperlink includes a link to a second web page. The processor performs natural language processing on the first web page to determine one or more context word tokens and on the second web page to determine a context of the second web page. The processor also applies a context relevant tag to the hyperlink to generate a tagged hyperlink. The processor maps at least one of the context word tokens to the context relevant tag applied to the hyperlink and generates a transaction score for the tagged hyperlink.

12 Claims, 5 Drawing Sheets

(56) References Cited

OTHER PUBLICATIONS

Web article entitled SKlearn.Base from webpage https://scikit-learn.org/stable/modules/classes.html?highlight=sklearn%20linear%20module (printed Oct. 29, 2020).
Web article entitled Industrial-Strength Natural Language Process in Python from webpage https://spacy.io/(printed Oct. 29, 2020).

* cited by examiner

METHODS AND SYSTEMS FOR ENHANCING PURCHASE EXPERIENCE VIA AUDIO WEB-RECORDING

FIELD OF THE DISCLOSURE

The field of the disclosure relates to web page audio readers, and more particularly, to creating digital tokens for hyperlinks where the tokens are mapped to products that can be purchased via a verbal response from a cardholder.

BACKGROUND

In ever-increasing numbers, individuals and organizations are offering fund raising, donation solicitation, and goods and services via websites. Typically, a customer navigates web pages of the website by entering commands via a computing device in communication with the Internet. The commands, however, are generally entered via physical interaction with an interface, such as a web browser. This can be difficult or even impossible for a visually-impaired user or a user that is otherwise unable to physically interact with the interface, particularly when the user wishes to perform a financial transaction.

Text-to-speech (TTS) systems or web page audio readers facilitate providing information on the web page to a user that is unable to, or chooses not to, interact physically with the web page interface. Such TTS systems typically convert text, for example location names, road names, and/or business names, to auditory speech that may be heard by the user. This may facilitate visually impaired persons to understand text on a web page, may facilitate hands-free device usage, and may also facilitate reading electronic files to a user such that the user may interact with the file. However, TTS systems typically do not recognize a hyperlink on the web page content. Moreover, TTS systems are unable to determine the relevancy of a hyperlink with the content of the web page. In addition, it is difficult or unworkable to navigate a webpage via a TTS system to perform a transaction.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computing system is provided. The computing system includes a processor programmed to perform operations including processing a first web page to identify a hyperlink contained thereon. The hyperlink includes a link to a second web page. The processor is programmed to perform natural language processing on the second web page to determine a context of the second web page. In addition, the processor is programmed to apply a context relevant tag to the hyperlink to generate a tagged hyperlink. Furthermore, the processor is programmed to perform natural language processing on the first web page to determine one or more context word tokens. The processor is also programmed to map at least one of the one or more context word tokens to the context relevant tag applied to the hyperlink, and generate a transaction score for the tagged hyperlink.

In another aspect, a computer-implemented method is provided. The computer-implemented method includes processing a first web page to identify a hyperlink contained thereon. The hyperlink includes a link to a second web page. The computer-implemented method also includes performing natural language processing on the second web page to determine a context of the second web page. Furthermore, the computer-implemented method includes applying a context relevant tag to the hyperlink to generate a tagged hyperlink. In addition, the computer-implemented method performs natural language processing on the first web page to determine one or more context word tokens. Moreover, the computer-implemented method includes mapping at least one of the one or more context word tokens to the context relevant tag applied to the hyperlink, and generating a transaction score for the tagged hyperlink.

In yet another aspect, one or more computer-readable media is provided. The computer-readable media has computer-executable instructions, which when executed perform operations, including processing a first web page to identify a hyperlink contained thereon. The hyperlink includes a link to a second web page. The computer-executable instructions also perform natural language processing on the second web page to determine a context of the second web page and apply a context relevant tag to the hyperlink to generate a tagged hyperlink. Furthermore, the computer-executable instructions perform natural language processing on the first web page to determine one or more context word tokens. Moreover, the computer-executable instructions map at least one of the one or more context word tokens to the context relevant tag applied to the hyperlink, and generate a transaction score for the tagged hyperlink.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Exemplary Audio Web-Reading System

Figure 1:
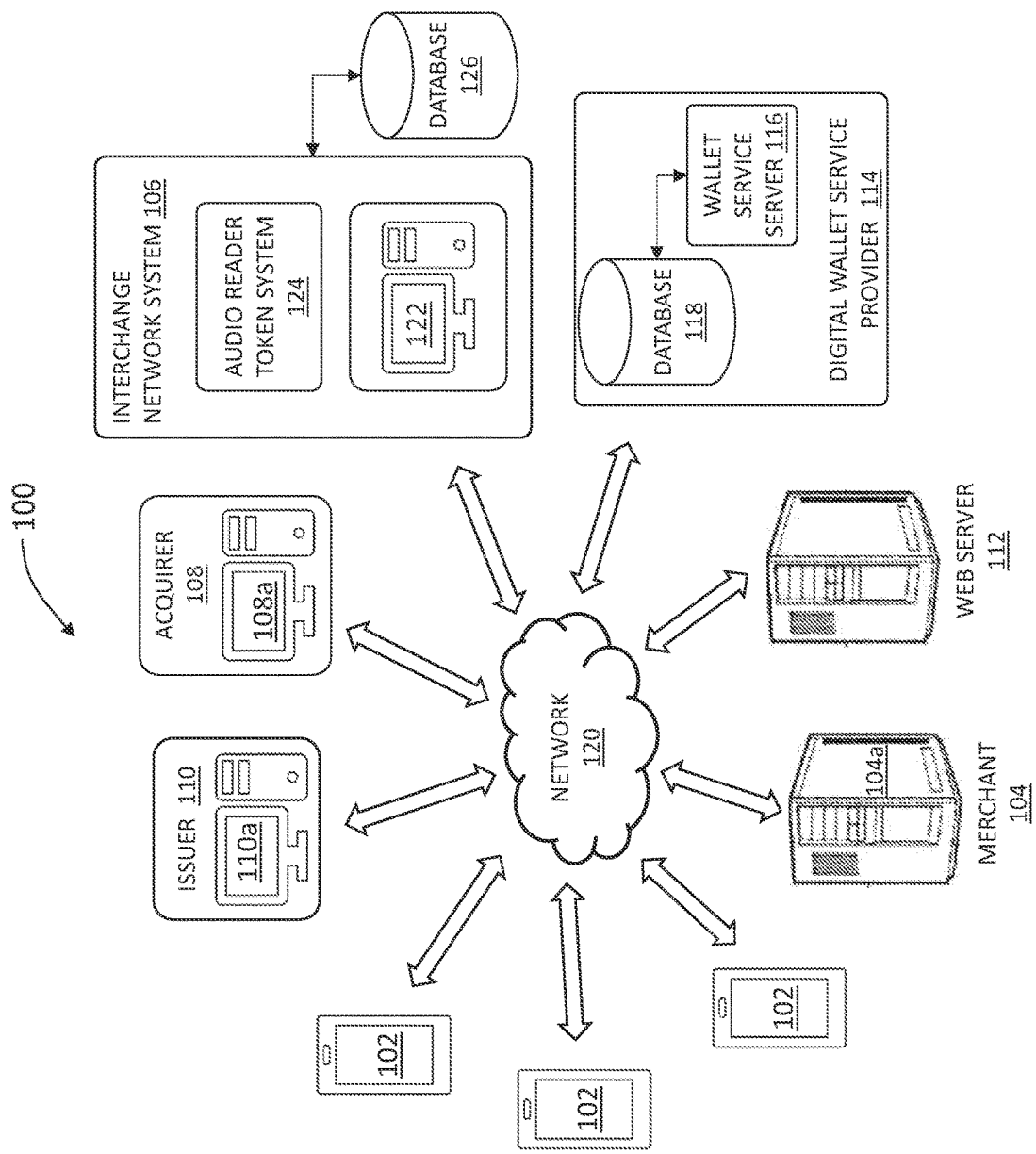
FIG. 1 is a block diagram of an example multi-party network system including a plurality of cardholder computing devices belonging to cardholders, in accordance with one embodiment of the present disclosure.

FIG. 1 is a block diagram of an example multi-party network system 100, including a plurality of cardholder mobile devices 102 belonging to cardholders, in accordance with one embodiment of the present disclosure. In the exemplary embodiment, the network system 100 provides interchange network services offered by one or more payment networks, such as interchange network system 106. In addition, the network system 100 enables payment card transactions in which cardholders (via the cardholder mobile devices 102), merchant 104, acquirers 108, and/or issuers 110, do not need to have a one-to-one relationship. Although parts of the network system 100 are presented in one arrangement, other embodiments may include the same or different parts arranged otherwise, depending, for example, on authorization processes for purchase transactions, communication between computing devices, etc. As used herein, the term "interchange network" includes an electronic network that exchanges data relating to the value of card sales and credits among the issuers 110 and the acquirers 108 (e.g., networks maintained, for example, by Mastercard®). (Mastercard is a registered trademark of Mastercard International Incorporated.)

In the example embodiment, the network system 100 generally includes one or more of the cardholder mobile devices 102, a wallet service provider 114, the interchange network system 106, the issuer 110, the merchant 104, the acquirer 108, and a web server 112 coupled in communication via a communications network 120. The network 120 includes, for example and without limitation, one or more of a local area network (LAN), a wide area network (WAN) (e.g., the Internet, etc.), a mobile network, a virtual network, and/or any other suitable public and/or private network capable of facilitating communication among the cardholder mobile device 102, the wallet service provider 114, the interchange network system 106, the issuer 110, the merchant 104, the acquirer 108, and/or the web server 112. In some embodiments, the network 120 includes more than one type of network, such as a private payment transaction network provided by the interchange network system 106 to the issuer 110, the merchants 104, and/or the acquirer 108 and, separately, the public Internet, which may facilitate communication between the cardholder mobile device 102, the web server 112, the wallet service provider 114, the interchange network system 106, the merchant 104, and the acquirer 108.

Embodiments described herein relate to transaction card systems, such as a credit card payment system using the Mastercard® interchange network. (Mastercard is a registered trademark of Mastercard International Incorporated.) The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment account issued by a card issuer (e.g., the issuer 110), and/or a digital wallet application (App). In addition, the financial transaction data includes purchase data representing a purchase made by a cardholder, including a type of merchant, amount of purchase, date of purchase, and other data, which may be transmitted between any parties of multi-party network system 100.

With continued reference to FIG. 1, in the exemplary embodiment, the cardholder mobile device 102 (e.g., a smartphone or other computing device used by the cardholder) includes a user interface that facilitates user interaction with the respective cardholder mobile device 102. For example, and without limitation, the user interface enables the cardholder to input information to the cardholder mobile device 102 and the cardholder mobile device 102 to output information to the cardholder (e.g., on a display of the cardholder mobile device 102). The user interface enables interaction with, for example, a digital wallet application, which is installed on the cardholder mobile device 102. In the exemplary embodiment, the digital wallet application is associated with the wallet service provider 114. It is contemplated that fewer or more financial applications may be installed on the cardholder mobile device 102 and displayed by the user interface, where each financial application is associated with at least one financial institution (not shown). Furthermore, the user interface may include, among other possibilities, a web browser and various other software applications. Web browsers enable users, such as a cardholder, to display and interact with media and other information typically embedded on a web page or a website as described further herein.

The cardholder computing device 102 can be any computing device capable of interconnecting to the network 120, such as the Internet, including a desktop computer, laptop, mobile web-based device, smartphone, PDA, or other mobile web-based connectable equipment. The cardholder computing device 102 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the cardholder computing device 102 is configured to communicate with other cardholder computing devices and/or merchant point-of-sale (POS) systems (not shown) using various forms of communication including, for example, radio frequency communication, near field communication (NFC), network-based communication, and the like.

In the system 100 described herein, a financial institution called the "card issuer" issues a payment card or account to the cardholder or consumer. The payment card or account includes an account identification number (e.g., a primary account number (PAN), a virtual PAN, a payment token, etc.) that is stored in the payment card and/or a digital wallet account maintained by the wallet service provider 114. A cardholder uses the payment card and/or the digital wallet application to tender payment for a purchase from the merchant 104 and/or the web server 112. In the example embodiment, the merchant 104 is typically associated with products, for example, goods and/or services, which are offered for sale and are sold to the cardholder. The merchant 104 includes, for example, a physical location and/or a virtual location. A physical location includes, for example, a brick-and-mortar store, etc., and a virtual location includes, for example, an Internet-based store-front. In the example, the merchant 104 is associated with a merchant server 104a, which may function as a web content server to transmit web pages to the cardholder mobile devices 102 via the network 120, such as the Internet. Further, the web server 112 provides content such as news, blogs, and the like to the cardholder mobile devices 102.

With respect to the digital wallet application, in the exemplary embodiment, the cardholder mobile device 102 communicates with the wallet service provider 114, for example, via the network 120, to synchronize financial data with the digital wallet account stored by or otherwise accessible to the digital wallet application. The wallet service provider 114 also accesses the network 120 to communicate with the issuer 110 and acquirer 108, via the interchange network system 106, to facilitate the exchange of funds and other financial data between the acquirer 108 and the cardholder's accounts at the issuer 110. In addition, the wallet service provider 114 communicates with the issuer 110 to exchange and/or synchronize financial data with the digital wallet account.

The cardholder mobile device 102 can be any computing device capable of interconnecting to the network 120, such as the Internet, including a mobile web-based device, smartphone, PDA, or other mobile web-based connectable equipment. The cardholder mobile device 102 is interconnected to the Internet through one or more interfaces including a network, such as a local area network (LAN) or a wide area network (WAN), dial-in-connections, cable modems, wireless modems, and special high-speed ISDN lines.

The wallet service provider 114 includes, for example, a digital wallet service server 116, which is connected to a database 118. In one embodiment, the database 118 is stored on the wallet service provider 114 and can be accessed by the cardholder by logging onto the wallet service provider 114, using, for example, the digital wallet application. In an alternative embodiment, the database 118 may be stored remotely from the wallet service provider 114 and may be non-centralized. The database 118 is configured to receive and store cardholder accounts (e.g., a digital wallet account) and rules associated with those accounts.

In the exemplary embodiment, to accept payment with the payment card or the digital wallet application, merchants, such as the merchant 104, must normally establish an account with a financial institution that is part of the payment card network system 100. This financial institution is usually called the "merchant bank," the "acquiring bank," or the "acquirer" (e.g., the acquirer 108). When the cardholder provides payment for a purchase with the payment card, the merchant 104 requests authorization from the acquirer 108 for the purchase amount. The request may be performed over the telephone but is usually performed using a point-of-sale (POS) terminal (not shown) that connects to the payment card. The POS terminal reads the cardholder's payment account information, such as the card identification number (e.g., the PAN), expiration date, etc. from a magnetic stripe and/or an integrated circuit chip on the payment card (or a payment token from the digital wallet application) and communicates electronically with the transaction processing computers of the acquirer 108, such as computer 108a. Alternatively, the acquirer 108 may authorize a third party to perform transaction processing on its behalf. In this case, the POS terminal will be configured to communicate with the third party. Such a third party is usually called a "merchant processor," an "acquiring processor," or a "third party processor."

Using the interchange network system 106, the acquirer computer 108a or merchant processor communicates with computers of the issuer computer 110a to determine whether the cardholder's accounts are in good standing and whether the purchase is covered by the cardholder's available credit lines. Based on these determinations, the requests for authorization will be declined or accepted. If the requests are accepted, an authorization code is transmitted to the merchant 104.

When a request for authorization is approved by the card issuer 110, the available credit line of the cardholder's account is decreased. Normally, a charge for a payment card transaction is not posted immediately to the cardholder's account because bankcard associations, such as Mastercard, have promulgated rules that do not allow the merchants 104 to charge, or "capture," a transaction until the purchased goods are shipped or the purchased goods or services are delivered. However, with respect to at least some debit card transactions, a charge may be posted at the time of the transaction. When the merchants 104 ships or delivers the goods or services, the merchants 104 captures the transaction by, for example, appropriate data entry procedures on the POS terminal. This may include bundling of approved transactions daily for standard retail purchases. The interchange network system 106 and/or the card issuer 110 stores the transaction data, such as, and without limitation, the card identification number, a type of merchant, a merchant identifier, a location where the transaction was completed, an amount of purchase, a merchant category code, a date and time of the transaction, products purchased and related descriptions or identifiers, etc., in a transaction database.

After a purchase has been completed, a clearing process occurs to transfer additional transaction data related to the purchase among the parties to the transaction, such as the acquirer 108, the interchange network system 106, and the card issuer 110. More specifically, during and/or after the clearing process, additional data, such as a time of purchase, a merchant name, a type of merchant, purchase information, consumer account information, a type of transaction, information regarding the purchased item and/or service, and/or other suitable information, is associated with a transaction and transmitted between the parties to the transaction as transaction data and may be stored by any of the parties to the transaction.

After a transaction is authorized and cleared, the transaction is settled among the merchant 104, the acquirer 108, and the card issuer 110. Settlement refers to the transfer of financial data or funds among the merchant 104, the acquirer 108, and the card issuer 110 related to the transaction. Usually, transactions are captured and accumulated into a "batch," which is settled as a group. More specifically, a transaction is typically settled between the card issuer 110 and the interchange network system 106, and then between the interchange network system 106 and the acquirer 108, and then between the acquirer 108 and the merchants 104. It should be appreciated that more or less information related to transactions, as part of either authorization, clearing, and/or settling, may be included in the transaction data and stored in the transaction database, at the merchants 104, the acquirer 108, the interchange network system 106, and/or the card issuer 110. Further, transaction data, unrelated to a particular payment account, may be collected by a variety of techniques and similarly stored in the transaction database.

In some embodiments, the cardholders involved in the transactions are prompted to agree to legal terms associated with their payment accounts, for example, during enrollment in such payment accounts, etc. As such, the cardholder may voluntarily agree to allow the merchant 104, the card issuer 110, the interchange network system 106, etc., to utilize data collected relating to processing the transactions, subsequently for one or more of the purposes described herein.

Furthermore, in the exemplary embodiment, the interchange network system 106 includes one or more payment network server systems 122 (also referred to as a payment system), which is coupled in communication to the network 120. The payment system 122 is a computing system including, for example, a web application server, an application programming interface (API) server, and a memory device. The interchange network system 106 also includes an audio reader token system 124 coupled in communication to the payment system 122 using, for example, and without limitation, an internal network (not shown) and/or the Internet. The payment system 122 is interconnected to the Internet through one or more interfaces including a network, such as a local area network (LAN) or a wide area network (WAN), dial-in-connections, cable modems, and special high-speed ISDN lines. The payment system 122 can be any computing device capable of interconnecting to the Internet. In certain embodiments of the present invention, the audio reader token system 124 is integrated with or is otherwise a part of the payment network server system 122.

The audio reader token system 124 includes, for example, a database server (which can be software or hardware) connected to a database 126. In one embodiment, the database 126 is stored on the audio reader token system 124. In an alternative embodiment, the database 126 may be stored remotely from the audio reader token system 124 and/or may be non-centralized. The database 126 is configured to receive and store data including, for example, and without limitation, one or more data mapping tables, data for use in one or more machine learning algorithms and models, account data and/or information associated with respective cardholder accounts, and/or other data or information.

The audio reader token system 124 establishes a connection with one or more of the merchant server 104a and the web server 112, for example, via the network 120. The audio reader token system 124 provides financial services to the cardholder, for example, via the cardholder computing device 102. To provide the services, the audio reader token system 124 enables a cardholder to place verbal orders via an audio reader service, such as the text-to-speech (TTS) computing device 516 (shown in FIG. 5), when the audio reader service is reading a selected web page. The audio reader token system 124 will assign a unique token or tag to each hyperlink contained in the web page. The tokens will be mapped to different products/services that can be purchased by calling a respective API. As used herein, the term "hyperlink" includes a connection to another web page or part of a web page using, for example, the web page's unique address called a Uniform Resource Locator (URL) or web address.

In an example embodiment, upon activation of an audio reader service (e.g., the TTS computing device 516) for a selected web page, the audio reader token system 124 analyzes the web page, for example, to determine relevant embedded hyperlinks to goods or services for purchase, and the availability of the relevant goods or services. The audio reader token system 124 cooperates with the audio reader service such that as the tokenized hyperlink to the goods or services is read aloud by the audio reader, the reader will pause, for example, to allow a cardholder to place a verbal command to purchase the goods or services, otherwise the reader will continue reading the web page.

While only certain numbers of the cardholder mobile devices 102, merchants 104, acquirers 108, interchange network system 106, issuers 110, web servers 112, and wallet service providers 114 are shown in FIG. 1 (for ease of reference), it should be appreciated that a variety of other embodiments may include any number of these parties in various combinations.

Exemplary Computer Systems

Figure 2:
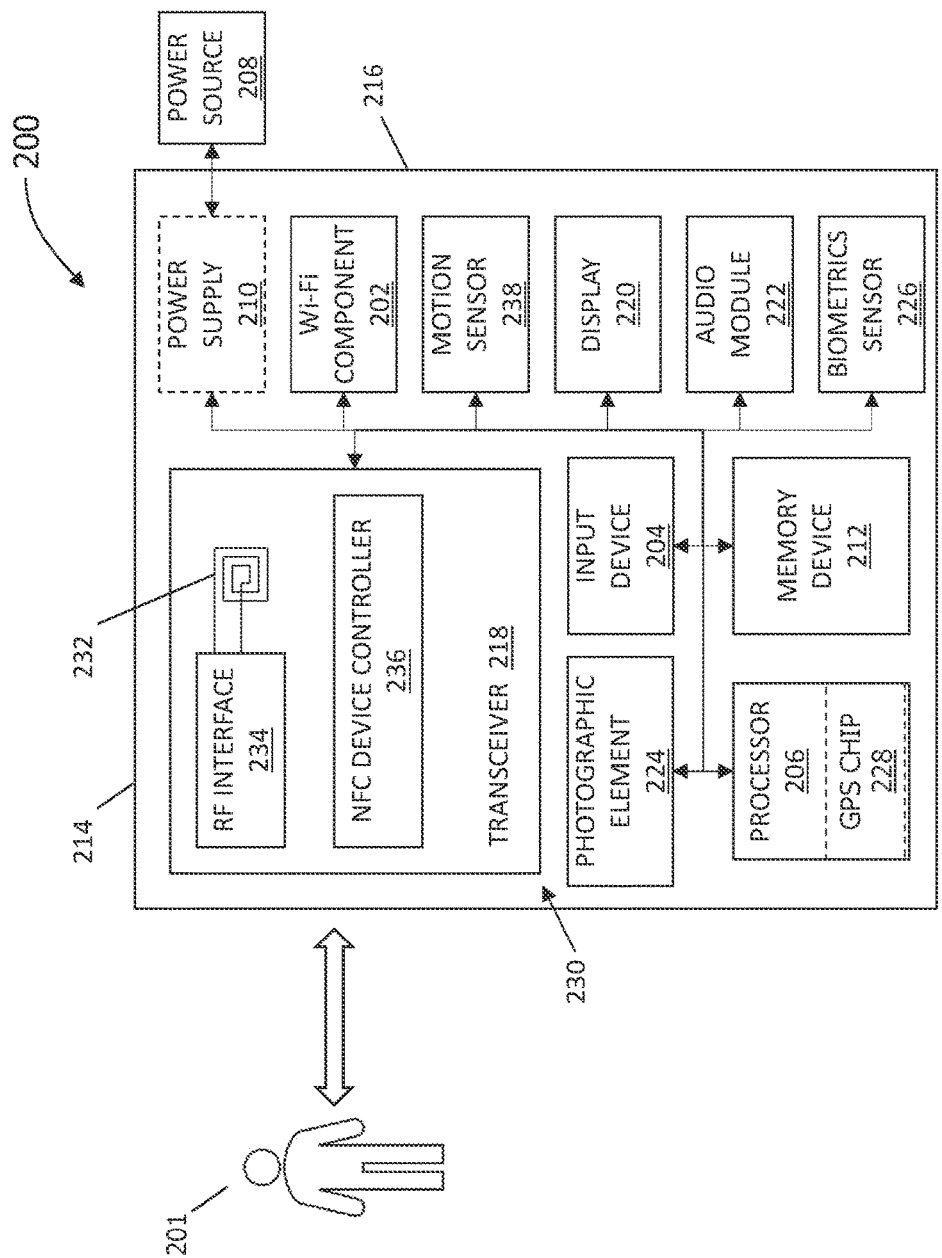
FIG. 2 is an example configuration of the cardholder computing device shown in FIG. 1 that may be operated by a cardholder.

FIG. 2 is an example configuration of a user computing system 200, such as the cardholder computing device 102 (shown in FIG. 1), that may be operated by a user, such as a cardholder 201. In the exemplary embodiment, the computing system 200 is a computing device configured to connect to one or more of the audio reader token system 124, the merchant computing device 104a, the issuer computing device 110a, the web server 112, and any other computing devices, such as other cardholder computing devices (not shown in FIG. 2).

In the exemplary embodiment, the computing system 200 generally includes a processor 206, a memory device 212, a transceiver 218 (or a wireless communication device), a photographic element 224, and a biometrics sensor 226. In addition, the computing system 200 includes an integrated Wi-Fi component 202 (e.g., implementing the Institute of Electrical and Electronics/IEEE 802.11 family of standards), an input device 204, a display 220, and an audio module 222. Moreover, the computing system 200 includes an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 includes one or more processing units (e.g., in a multi-core configuration) specially programmed for executing computer readable instructions. The computer readable instructions may be executed within a variety of different operating systems (OS) on the cardholder computing device 102, such as UNIX, LINUX, Microsoft Windows®, etc. More specifically, the computer readable instructions may cause various data manipulations on data stored in the memory device 212 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information such as the computer readable instructions and/or written works to be stored and retrieved. The memory device 212 includes one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for conducting cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for the computing system 200. Therefore, the network system 100 provides a mechanism for automatically updating the software on the computing system 200. For example, an updating mechanism may be used to automatically update any number of components and their drivers, both network and non-network components, including system level (OS) software components. In some embodiments, the computing system 200 components are dynamically loadable and unloadable; thus, they may be replaced in operation without having to reboot the OS.

A location of the computing system 200 can be obtained, for example, via a location service (e.g., global positioning system (GPS) service) in the computing system 200, "ping" data that includes geotemporal data, from cell location register information held by a telecommunications provider to which the computing system 200 is connected, and the like. For example, in one suitable embodiment, an optional GPS chip 228 can be part of or separate from the processor 206 to enable the location of the computing system 200 to be determined.

Stored in the memory device 212 are, for example, computer readable instructions for providing a user interface to the user via the display 220 and, optionally, receiving and processing input from the input device 204. A user interface may include, among other possibilities, a web browser and digital wallet application. Web browsers enable users, such as the cardholder 201, to display and interact with media and other information typically embedded on a web page or a website. The digital wallet application allows the user to interact with computers of the merchant 104, the web server 112, and the audio reader token system 124 to provide transaction card details, cardholder consent, and cardholder authentication information thereto.

The photographic element 224 may include a camera or other optical sensor and lens combination capable of generating a video signal and capturing an image. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

The biometrics sensor 226 is a biometric input device coupled in communication with at least the processor 206 and the memory device 212. The biometrics sensor 226 enables the user to enter a biometric sample. For example, the biometrics sensor 226 is a hardware component and includes, for example, an integral fingerprint or palm reader/scanner, retinal or iris reader/scanner, camera, and/or voice reader/recorder. The user inputs one or more biometrics and stores them as a biometric profile in the memory device 212. The biometrics of the user, such as the cardholder 201, includes one or more scans or digital representations of physical features of the user that are to be validated/authenticated during a purchase transaction, for example. The biometrics or physical features can include, for example, and without limitation, voice, fingerprint, iris, vein pattern, face, or the like. Feature data from a biometric scan or digital representation may be extracted to select features of interest. The biometric profile may be further stored, for example, by the issuer 110, digital wallet service provider 114, and/or the interchange network system 106 in a database, such as the databases 118 or 126.

In some embodiments, the motion sensor 238 may include one or more sensor elements that facilitate detecting a person's presence. For example, if the computing system 200 is operating as the cardholder computing device 102, the motion sensor 238 detects when the cardholder 201 moves or raises the cardholder computing device 102. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the person's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect a person's presence by detecting that the person has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 120 (shown in FIG. 1) and/or other computing devices (e.g., other cardholder computing devices, the audio reader token system 124, the issuer 110, the merchant 104, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the cardholder computing device 102. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing system 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other NFC-enabled computing devices, for example, another cardholder computing device, merchant point-of-sale (POS) systems (not shown), and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the cardholder computing device 102 is located within a predetermined distance of another cardholder computing device and/or a merchant point-of-sale system (not shown). Therefore, the magnetic field generated by the antenna 232 defines the active range of the computing system 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
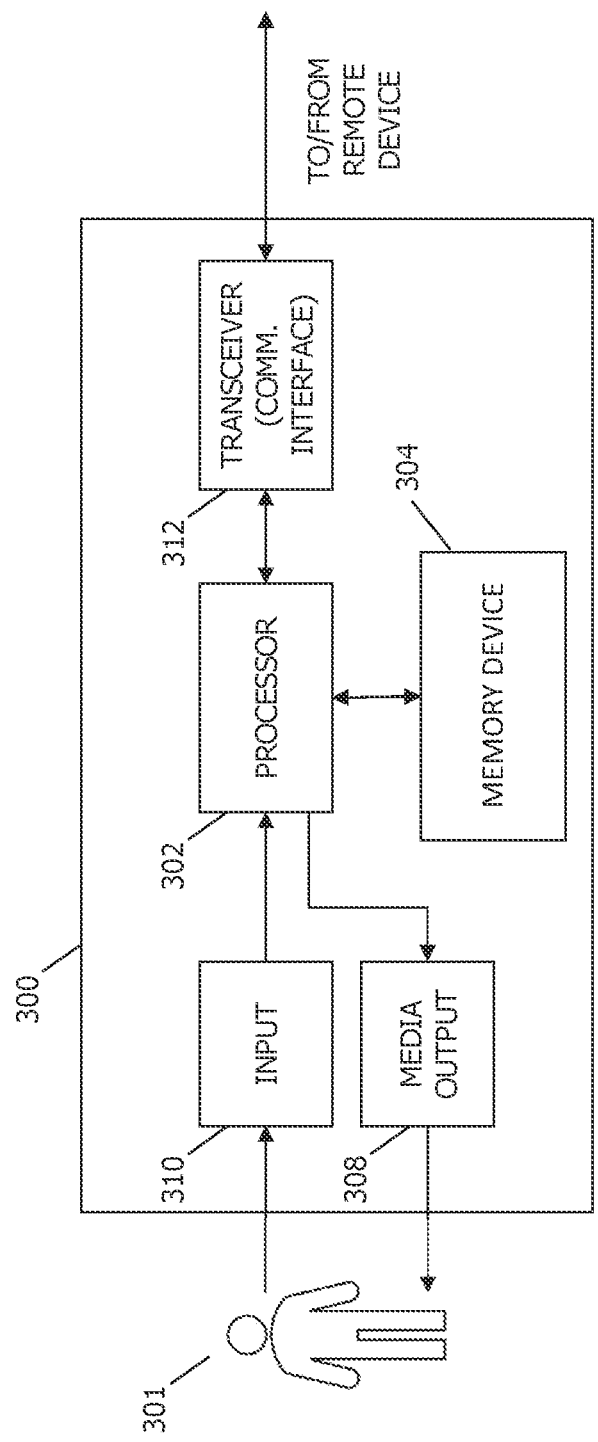
FIG. 3 is an example configuration of a computing system for use in the network system shown in FIG. 1.

FIG. 3 is an example configuration of a computing system 300 operated by a user 301. In some embodiments, the computing system 300 is the audio reader token system 124 (shown in FIG. 1), the payment system 122 (shown in FIG. 1), and/or a computing system of the merchant 104, acquirer 108, or issuer 110.

In the example embodiment, the computing system 300 includes one or more processors 302 for executing computer readable instructions. In some embodiments, computer readable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The computing system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the computing system 300 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The computing system 300 may also include a transceiver 312 (broadly, a communication interface), which is communicatively connectable to a remote device such as the cardholder computing device 102 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications. Web browsers enable users to display and interact with media and other information typically embedded on a web page or a website. The various software applications allow the user 301 to interact with the computing system 300 to further communicate with the cardholder computing device 102, the audio reader token system 124, etc. to facilitate providing various services to the cardholder and, optionally, execute a transaction upon delivery of such services.

Figure 4:
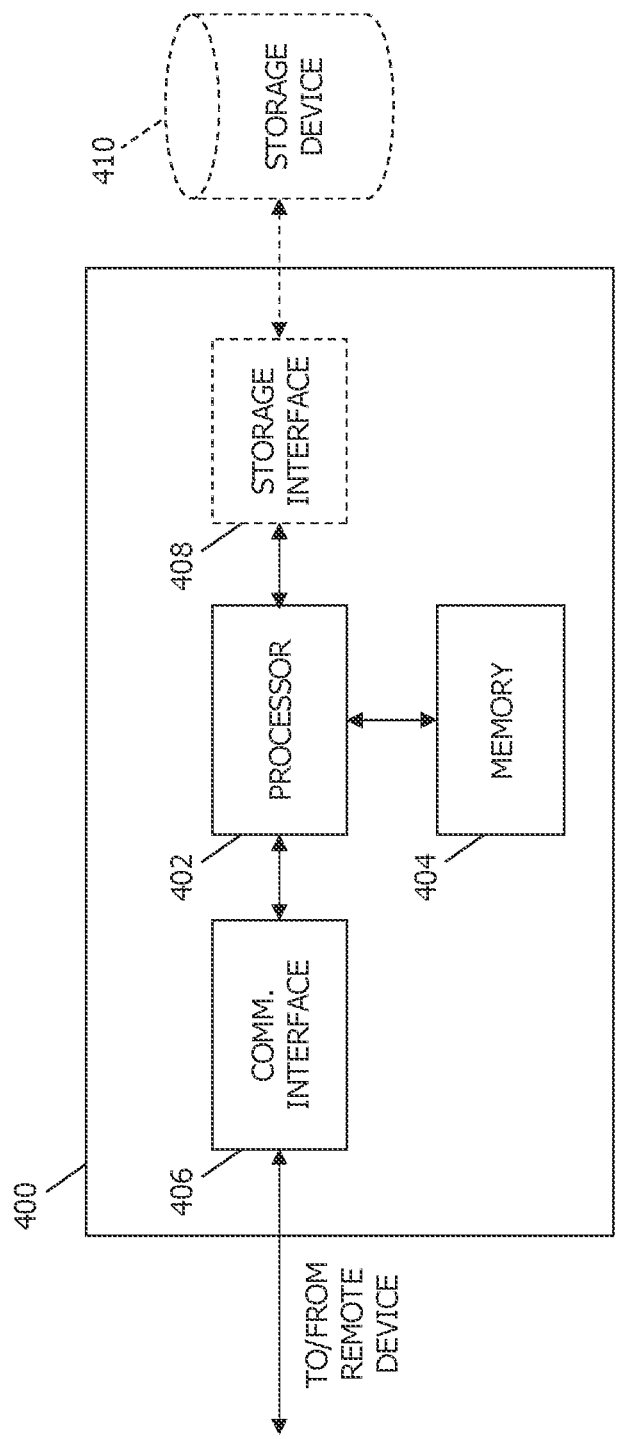
FIG. 4 is an example configuration of a server system for use in the network system shown in FIG. 1.

FIG. 4 is an example configuration of a server system 400, such as the digital wallet service server 116 and/or the web server 112 (shown in FIG. 1). In the example embodiment, the server system 400 includes a processor 402 for executing computer readable instructions. The computer readable instructions may be stored in a memory area 404, for example. The processor 402 includes one or more processing units (e.g., in a multi-core configuration) for executing the computer readable instructions. The computer readable instructions may be executed within a variety of different operating systems on the server system 400, such as UNIX, LINUX, Microsoft Windows®, etc. More specifically, the computer readable instructions may cause various data manipulations on data stored in a storage device 410 (e.g., create, read, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as cardholder computing device 102, a computing system 300, or another server system. For example, the communication interface 406 may receive communications from the audio reader token system 124.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the database 118 and/or 126 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a computing system 300, such as the processor 302, the memory device 304, and/or the transceiver 312.

Exemplary Computer-Implemented Methods

Figure 5:
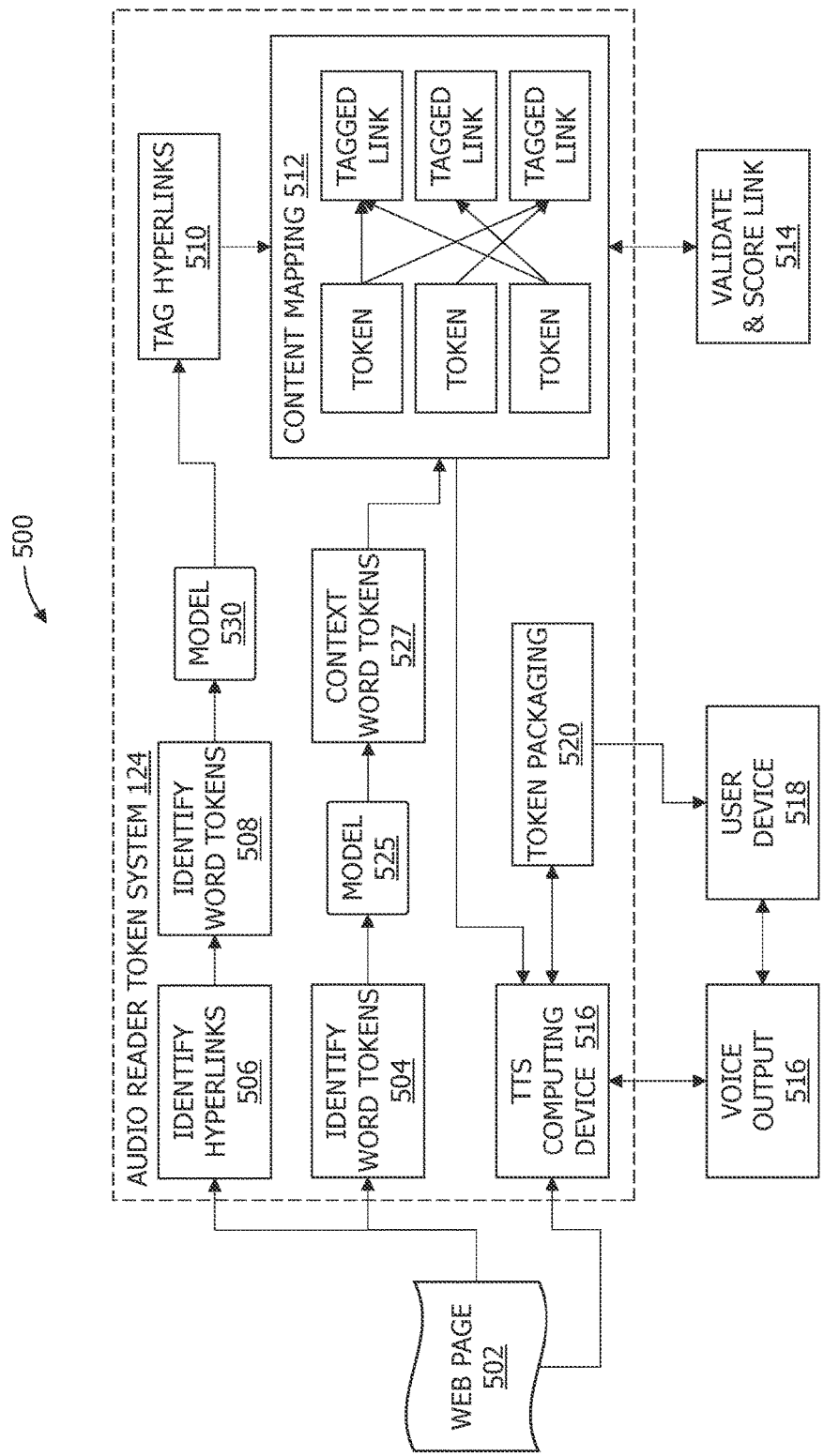
FIG. 5 is a flowchart illustrating an exemplary computer-implemented method for tokenizing a hyperlink for use by a web page audio reader, in accordance with one embodiment of the present disclosure.

FIG. 5 is a flowchart illustrating an exemplary computer-implemented method 500 for tokenizing a hyperlink for use by a web page audio reader, in accordance with one embodiment of the present disclosure. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the audio reader token system 124. In the exemplary embodiment, the computer-implemented method 500 relates to identifying relevant hyperlinks for financial transactions (e.g., purchase goods or services, donations, etc.) in a web page and tokenizing the hyperlinks for use by a web page audio reader for verbal transaction execution. While operations within the computer-implemented method 500 are described below regarding the audio reader token system 124, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, the audio reader token system 124 processes a web page, such as web page 502, for context identification and creation of tokens upon activation of an audio reader program, such as the TTS computing device 516. For example, the audio reader token system 124 performs natural language processing on the web page 502 by scanning the text and generating one or more word tokens 504. The audio reader token system 124 may assign the web page 502 a web page ID for future identification and/or use.

In one example, part of the natural language processing may be performed using Natural Language Toolkit (NLTK). NLTK is a Python-based Natural Language Processing (NLP) open source library. NLTK provides extendible implementations for basic NLP processing which may include sentence segmentation, word tokenization, part-of-speech tagging, shallow parsing ("chunking"), and text classification. The word tokens 504 may be generated using various tokenizing techniques available in NLTK. For example, the text may be read via a whitespace tokenizer that splits the text into a sequence of whitespace delimited tokens. The sequence may be filtered, for example, by removing all words less a selected threshold, such as five (5) characters long and by removing stop words (e.g., stop 'the', 'is', 'are', etc.). In another example, the text may be read via a punctuation tokenizer that splits the text into a sequence of alphabetic and non-alphabetic characters. In yet another example, the text may be read via a treebank word tokenizer that splits the text into a sequence of words. For example, a treebank tokenizer splits standard contractions, treats most punctuation characters as separate tokens, splits off commas and single quotes (when followed by whitespace), and separates periods that appear at the end of line.

In another embodiment, part of the natural language processing may be performed using spaCy. SpaCy is a Python-based NLP open source library that provides extendible implementation for an end-to-end NLP processing pipeline, which may be used for: sentence segmentation, word tokenization, part-of-speech tagging, dependency parsing, named entity recognition, and word embedding vectors.

After the word tokens 504 are generated, a feature extraction process may be performed using, for example, SciKit Learn (sklearn) Count Vectorizer or Term Frequency, or Inverse Document Frequency (TF-IDF-TfidfVectorizer). Feature extraction may be used to transform a given text (e.g., a word token 504) into a vector on the basis of the frequency (count) of each word that occurs in the entire text of the web page 502. This may be helpful when there are multiple web pages, and a user desires to convert each word in each web page into vectors (e.g., for use in further text analysis).

After the feature extraction process, a model 525 is trained using various datasets. In the exemplary embodiment, the model 525 may be trained using a sklearn linear model importing a classifier called Logistic Regression and feature extraction by importing Count Vectorizer. The data may be split into training and test sets. This facilitates ensuring that after training the model (i.e., the classification algorithm), it is able to generalize well to new data. The model is configured to output one or more context and keyword tokens 527 for use in content mapping to the hyperlinks, as described further herein. Below is an example code snippet for splitting the data:

```
from sklearn.model_selection import train_test_split
X = df_amazon['verified_reviews'] # the features to analyze
ylabels = df_amazon['feedback'] # the labels, or answers, to test against
X_train, X_test, y_train, y_test = train_test_split(X, ylabels, test_size=0.3)
```

In the exemplary embodiment, the audio reader token system 124 processes the web page 502 to identify the hyperlinks 506 on the web page using, for example, a rule-based system. A rule-based system includes a list of rules or rule base, which is specific to identifying hyperlinks embedded in a web page. After the hyperlinks 506 are identified, the audio reader token system 124 performs natural language processing on the web pages linked to by the hyperlinks for context identification by scanning the text and generating one or more word tokens 508. The natural language processing for the "linked" web pages includes substantially the same processing operations described above to generate the word tokens 504. In the exemplary embodiment, the hyperlinks 506 are associated with a product or service that can be purchased by a user.

After the word tokens 508 for the "linked" web pages are generated, a feature extraction process may be performed using substantially the same processes described above. For example, the process may be performed using sklearn Count Vectorizer or Term Frequency, or TF-IDF. Feature extraction may be used to transform a given text (e.g., a word token 508) into a vector on the basis of the frequency (count) of each word that occurs in the entire text of the linked web page.

After the feature extraction process, a model 530 is trained using various datasets. In the exemplary embodiment, the model 530 may be trained in substantially the same manner as the model 525. For example, training may be performed using a sklearn linear model importing the Logistic Regression classifier and feature extraction by importing Count Vectorizer. The data may be split into training and test sets as described above.

The identified hyperlinks are tagged to generate tagged hyperlinks 510. That is, a context relevant tag is applied to the hyperlinks. The tags are context relevant or context aware tags based on the relevant context determined, for example, by the model 530. For example, a hyperlink that directs a user to a donation link for forest fires may be tagged as a "Forest Donation Merchant" {Tag 1}. A second hyperlink that directs a user to a donation link for helping injured or displaced animals may be tagged "Animal Care Merchant" {Tag 2}. Similarly, a hyperlink that directs a user to purchase a pair of hiking boots may be tagged "Online Merchant Apparel" {Tag 3}.

The tagged hyperlinks 510 and the context word tokens 527 are mapped to respective ones of each other based on context by the content mapping component 512. In the exemplary embodiment, the content mapping component may be a rule-based system. The rule-based mapping may be performed in the following manner. The text may be segmented using Named Entity Recognition (NER). In a typical implementation, NER involves processing input text to generate data about each word of the input, and then comparing that data to elements in an NER model to determine which element is the best fit for the input data. After performing NER, the content mapping component 512 may perform relationship extraction for detection and classification of semantic relationships between the extracted entities. The content mapping component 512 may then perform sentiment analysis of the hyperlinks and tags to categorize each rule as Positive, Negative, or Neutral. Sentiment analysis is an NLP task that automates the recognition and understanding of the attitudes and/or opinions expressed in a human-generated text.

After mapping the tagged hyperlinks 510 and the context word tokens 527, the content mapping component 512 may perform a product validation process and generate a transaction score for each of the tagged hyperlinks 510. The product validation process includes analyzing three (3) parameters associated with the product or service. In the exemplary embodiment, the content mapping component 512 may implement one or more application programming interfaces (APIs) to call each hyperlinked web page to collect relevant product identification and the product's availability. The content mapping component 512 may perform a fraud checking process where the content mapping component 512, using data from the interchange network system 106, evaluates the linked merchant based on a number of chargebacks and/or any previously detected fraud. The content mapping component 512 may implement an API configured to determine the product listing and availability using the merchant warehouse database. Further, the content mapping component 512 may perform a time period check process. For example, the content mapping component 512 may analyze transaction data of the merchant to determine whether the last successful transaction for the product or service offered by that merchant occurred in a predetermined period. For example, if no transaction was performed in the previous nine (9) months, the content mapping component 512 may assign a low period check score. The content mapping component 512 may generate the score for the tagged hyperlink 510 based on the analysis of these three (3) parameters: fraud check, product availability; and period check. If the transaction score is within a predefined range or meets a preselected threshold, the tagged hyperlink 510 may be implemented for transaction processing, for example, by assigning it a hyperlink ID.

When a user selects to have a web page, such as the web page 502, read to them by an audio reader, such as the TTS computing device 516, the web page may be processed by the audio reader token system 124 as described above. The TTS computing device 516 converts text data from the web page 502 to an audible machine speech output that is communicated to the user via a user device 518, such as the cardholder computing device 102 (shown in FIG. 1). The TTS computing device 516 receives the tagged hyperlinks 510 from the content mapping component 512 and incorporates them into the audible machine speech output. For example, the TTS computing device 516 may play back the audible machine speech output such that the user may hear the text data instead of reading the text data. When the TTS computing device 516 encounters a tagged hyperlink 510, it may play back the tag and pause for a predetermined period to allow the user to activate (i.e., verbally select) the tagged hyperlink. In example embodiments, the predetermined period may be in the range between and including about one second (1 s) and about three seconds (3 s). In certain other embodiments, the predetermined period may be in a range between and including about one and a half seconds (1.5 s) and about two and a half seconds (2.5 s). In a preferred embodiment, the predetermined period may be about two seconds (2 s). It is noted, however, that the predetermined period may be any period that enables the audio reader token system 124 to function as described herein.

When a user selects to activate a tagged hyperlink 510, the user provides a voice response, for example, that may be assigned a voice authorization ID. The user device 518 may also transmit a user device ID when initiating text-to-speech processing via the TTS computing device 516. Upon receiving the activating response from the user, via the user device 518, the audio reader token system 124 may bundle the web page ID, hyperlink ID, user device ID, and voice authorization ID together into a transaction bundle. The audio reader token system 124 may transmit the transaction bundle to the digital wallet application installed on the user device 518 to tender payment for a donation/purchase from the merchant 104 and/or the web server 112 associated with the tagged hyperlink 510.

The systems and methods described herein provide for performing financial transactions via an audio reader when a selected web page is read to a user by the audio reader. In particular, a hyperlink contained in the web page may have a token assigned, which is mapped to different products that can be purchased by the user. This enables the audio reader to function as a personal, contactless terminal for performing transactions. As described herein, tokenizing the hyperlinks as disclosed facilitates eliminating or substantially reducing the need for a user to physically interact with the web page via a user interface by selecting, for example, a hyperlink via touch or click. The disclosed techniques allow visually impaired users to easily perform transactions available via a web page by using their voice while listening to the web page being read by an audio reader.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A computing system having an audio reader and a content mapping component, said computing system comprising:
   a processor; and
   a memory storing instructions that when executed by the processor causes the processor to perform the operations of:
      storing a score threshold and a range for the score threshold;
      receiving, from a user device of a user, a user device ID;
      receiving, from the user device, a request to have a first web page read aloud to the user via the audio reader and audibly reading, via the audio reader, the first web page to the user, via the user device;
      based on the request, analyzing, via the content mapping component, the first web page, wherein analyzing includes identifying a hyperlink to a second web page in the first web page, wherein the second web page is associated with a merchant and a product offered for sale by the merchant;
      accessing the second web page via the hyperlink;
      scanning, using natural language processing, text of the second web page;
      generating a tagged hyperlink for the second web page by generating a tag based on the scanned text and applying the tag to the hyperlink;
      determining, via the content mapping component, that the tagged hyperlink is valid for a financial transaction of the user by:
         calling the second web page using one or more application programming interfaces (APIs) and determining availability of the product,
         receiving data from an interchange network system and determining a fraud history of the merchant,
         calling the second webpage using the one or more APIs and determining a transaction history of the merchant, and
         generating a score for the tagged hyperlink based on the determined availability, fraud history, and transaction history;
      determining, via the content mapping component, that the generated score is within the range of the score threshold and assigning to the tagged hyperlink a hyperlink ID;
      receiving, from the user device, an audio request from the user to activate the tagged hyperlink; and
      in response to the audio request, generating a transaction bundle that includes the user device ID and the hyperlink ID and transmitting the transaction bundle to a digital wallet on the user device.

2. The computing system in accordance with claim 1, the operation of determining the fraud history of the merchant comprises evaluating the merchant based on a number of chargebacks and any previously detected fraud.

3. The computing system in accordance with claim 1, the operation of determining the availability of the product comprises determining the product availability using a merchant warehouse database associated with the merchant using the one or more APIs.

4. The computing system in accordance with claim 1, the operation of determining the transaction history of the merchant comprises analyzing transaction data of the merchant over a time period and determining whether a last successful transaction for the product or service occurred in the time period.

5. The computing system in accordance with claim 1, the instructions further causing the processor to perform operations comprising:
   assigning a web page ID to the first web page;
   assigning a voice authorization ID to the audio request; and
   including the web page ID and the voice authorization ID in the transaction bundle.

6. A computer-implemented method performed by a computing system having a processor, an audio reader and a content mapping component, said method comprising:
   storing, by the processor, a score threshold and a range for the score threshold;
   receiving, by the processor, from a user device of a user, a user device ID;
   receiving, by the processor, from the user device, a request to have a first web page read aloud to the user via the audio reader and audibly reading, by the processor, via the audio reader, the first web page to the user, via the user device;
   based on the request, analyzing, by the processor, via the content mapping component, the first web page, wherein analyzing includes identifying a hyperlink to a second web page in the first web page, wherein the second web page is associated with a merchant and a product offered for sale by the merchant;
   accessing, by the processor, the second web page via the hyperlink;
   scanning, by the processor, using natural language processing, text of the second web page;
   generating, by the processor, a tagged hyperlink for the second web page by generating a tag based on the scanned text and applying, by the processor, the tag to the hyperlink;
   determining, by the processor, via the content mapping component, that the tagged hyperlink is valid for a financial transaction of the user by:
      calling the second web page using one or more application programming interfaces (APIs) and determining availability of the product,
      receiving data from an interchange network system and determining a fraud history of the merchant,
      calling the second web page using the one or more APIs and determining a transaction history of the merchant, and
      generating a score for the tagged hyperlink based on the determined availability, fraud history, and transaction history;
   determining, by the processor, via the content mapping component, that the generated score is within the range of the score threshold;
   assigning to the tagged hyperlink a hyperlink ID;
   receiving, by the processor, from the user device, an audio request from the user to activate the tagged hyperlink; and
   in response to the audio request, generating, by the processor, a transaction bundle that includes the user device ID and the hyperlink ID and transmitting, by the processor, the transaction bundle to a digital wallet on the user device.

7. The computer-implemented method in accordance with claim 6,
the operation of determining the fraud history of the merchant comprising evaluating, by the processor, the merchant based on a number of chargebacks and any previously detected fraud.

8. The computer-implemented method in accordance with claim 6,
the operation of determining the availability of the product comprising determining, by the processor, the product availability using a merchant warehouse database associated with the merchant using the one or more APIs.

9. The computer-implemented method in accordance with claim 6,
the operation of determining the transaction history of the merchant comprising analyzing transaction data of the merchant over a time period and determining whether a last successful transaction for the product or service occurred in the time period.

10. The computer-implemented method in accordance with claim 4 further comprising:
assigning, by the processor, a web page ID to the first web page;
assigning, by the processor, a voice authorization ID to the audio request; and
including, by the processor, the web page ID and the voice authorization ID in the transaction bundle.

11. One or more non-transitory computer-readable media having computer-executable instructions, which when executed by a processor, cause the processor to perform operations, comprising:
storing a score threshold and a range for the score threshold;
receiving, from a user device of a user, a user device ID;
receiving, from the user device, a request to have a first web page read aloud to the user via an audio reader and audibly reading, via the audio reader, the first web page to the user, via the user device;
based on the request, analyzing, via a content mapping component, the first web page, wherein analyzing includes identifying a hyperlink to a second web page in the first web page, wherein the second web page is associated with a merchant and a product offered for sale by the merchant;
accessing the second web page via the hyperlink;
scanning, using natural language processing, text of the second web page;
generating a tagged hyperlink for the second web page by generating a tag based on the scanned text and applying the tag to the hyperlink;
determining, via the content mapping component, that the tagged hyperlink is valid for a financial transaction of the user by:
calling the second web page using one or more application programming interfaces (APIs) and determining availability of the product,
receiving data from an interchange network system and determining a fraud history of the merchant,
calling the second web page using the one or more APIs and determining a transaction history of the merchant, and
generating a score for the tagged hyperlink based on the determined availability, fraud history, and transaction history;
determining, via the content mapping component, that the generated score is within the range of the score threshold and assigning to the tagged hyperlink a hyperlink ID;
receiving, from the user device, an audio request from the user to activate the tagged hyperlink; and
in response to the audio request, generating a transaction bundle that includes the user device ID and the hyperlink ID and transmitting the transaction bundle to a digital wallet on the user device.

12. The one or more non-transitory computer-readable media in accordance with claim 11 having further computer-executable instructions which when executed by the processor, cause the processor to further perform operations comprising:
assigning a web page ID to the first web page;
assigning a voice authorization ID to the audio request; and
including the web page ID and voice authorization ID in the transaction bundle.

* * * * *